United States Patent
Hanelt et al.

(10) Patent No.: US 11,154,870 B2
(45) Date of Patent: Oct. 26, 2021

(54) METHOD FOR GRINDING SILICON-CONTAINING SOLIDS

(71) Applicant: WACKER CHEMIE AG, Munich (DE)

(72) Inventors: Eckhard Hanelt, Geltendorf (DE); Michael Fricke, Burghausen (DE)

(73) Assignee: WACKER CHEMIE AG, Munich (DE)

(*) Notice: Subject to any disclaimer, the term of this patent is extended or adjusted under 35 U.S.C. 154(b) by 0 days.

(21) Appl. No.: 16/067,845

(22) PCT Filed: Nov. 7, 2016

(86) PCT No.: PCT/EP2016/076825
§ 371 (c)(1),
(2) Date: Jul. 3, 2018

(87) PCT Pub. No.: WO2018/082789
PCT Pub. Date: May 11, 2018

(65) Prior Publication Data
US 2019/0247859 A1 Aug. 15, 2019

(51) Int. Cl.
*B02C 19/06* (2006.01)
*C01B 33/02* (2006.01)
*H01M 4/38* (2006.01)
*H01M 10/0525* (2010.01)

(52) U.S. Cl.
CPC ............ *B02C 19/068* (2013.01); *B02C 19/06* (2013.01); *C01B 33/02* (2013.01); *C01P 2004/51* (2013.01); *C01P 2004/61* (2013.01); *H01M 4/386* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 7,490,785 B2 | 2/2009 | Weidhaus | |
| 7,850,102 B2 | 12/2010 | Meier et al. | |
| 7,866,582 B2 | 1/2011 | Nied | |
| 8,039,105 B2* | 10/2011 | Meier | B02C 19/06 428/402 |
| 9,010,666 B2 | 4/2015 | Nied et al. | |
| 2004/0213955 A1 | 10/2004 | Boyle et al. | |
| 2008/0054106 A1 | 3/2008 | Zehavi et al. | |
| 2012/0189929 A1 | 7/2012 | Yokoi et al. | |
| 2015/0057145 A1* | 2/2015 | Beebe | C22C 1/02 501/96.3 |
| 2015/0283534 A1* | 10/2015 | Costantino | C10L 3/10 585/16 |
| 2016/0101982 A1 | 4/2016 | Pedron et al. | |
| 2016/0164085 A1* | 6/2016 | Hanelt | C09C 1/28 429/218.1 |
| 2016/0355685 A1* | 12/2016 | Ono | H01L 23/295 |
| 2017/0113228 A1 | 4/2017 | Forstpointner et al. | |
| 2017/0246111 A1* | 8/2017 | Monsuur | A61K 9/0048 |
| 2018/0214884 A1 | 8/2018 | Nied et al. | |
| 2019/0076931 A1 | 3/2019 | Oda et al. | |

FOREIGN PATENT DOCUMENTS

| | | |
|---|---|---|
| CN | 101244402 A | 8/2008 |
| DE | 19824062 A1 | 12/1999 |
| DE | 102006048850 A1 | 4/2008 |
| DE | 102006048865 A1 | 4/2008 |
| DE | 102011102614 A1 | 11/2012 |
| DE | 102013215257 A1 | 2/2015 |
| DE | 102014211037 A1 | 12/2015 |
| EP | 1754539 B1 | 9/2008 |
| EP | 3027690 B1 | 6/2017 |
| WO | 2014180693 A1 | 11/2014 |
| WO | 2015127290 A1 | 8/2015 |
| WO | 2016202320 A1 | 12/2016 |

OTHER PUBLICATIONS

How Superheated Steam is Obtained, Agrawal, Publication Year 2016, Total pp. 1. (Year: 2020).*
Superheated Steam Table, Vandergrift, Publication Year 2015, Total pp. 2. (Year: 2020).*
Surface Area and Oxidation Effects on Nitridation Kinetics of Silicon Powder Compacts, Bhatt et al., Publication Year 1998, Total pp. 12, Link: <https://ntrs.nasa.gov/search.jsp> and search title. (Year: 2020).*
English language abstract of DE 19824062 A1 (1999).
International Search Report of PCT/EP2016/076825 (dated Jun. 21, 2017).
Wikipedia: "Strahlmühle", S. Ebel and FI. J. Roth (Publisher): Lexikon der Pharmazie, Georg Thieme Verlag, 1987, p. 405, Weblink: http://www.escolabor.ch/JMRSdt.pdf.
English language translation of "Strahlmühle".
Netzsch-Condux Mahltechnik, Hanau, Germany, "Test Report Grinding" (2013).

* cited by examiner

*Primary Examiner* — Teresa M Ekiert
*Assistant Examiner* — Sarkis A Aktavoukian
(74) *Attorney, Agent, or Firm* — Caesar Rivise, PC

(57) ABSTRACT

The object of the invention are methods for the production of silicon particles by grinding silicon-containing solids in a jet mill using a grinding fluid containing water vapor.

25 Claims, No Drawings

METHOD FOR GRINDING SILICON-CONTAINING SOLIDS

CROSS-REFERENCE TO RELATED APPLICATIONS

This application is a U.S. National Phase Application of PCT/EP2016/076825, filed Nov. 7, 2016, the contents of which are incorporated herein by reference in their entireties for all purposes.

BACKGROUND OF THE INVENTION

The invention relates to processes for milling silicon-containing solids by means of a jet mill.

In many applications, there is a need for silicon particles having particle diameters in the micron range, for example when silicon particles are used as active material in negative electrodes of lithium ion batteries. One way of producing such particles goes via the comminution of larger silicon particles, for example by milling. Thus, EP1754539 describes the comminution of silicon granules by means of a fluidized-bed jet mill, with nitrogen, argon or purified air being able to be used as milling gas stream, in order to produce silicon particles having diameters of from 50 to 1000 µm. However, silicon particles having average particle sizes of generally less than 3 µm are required for lithium ion batteries. To produce finely divided silicon powders having average particle sizes of, for example, from 0.02 to 10 µm, use is frequently made of wet milling processes, as known from EP3027690. In wet milling processes, the material being milled is suspended in a milling liquid. Milling liquids such as alcohols can react with the silicon surfaces with liberation of hydrogen. After wet milling, drying and thus an additional process step is necessary to produce dry powder. A disadvantage is that drying of the milling suspensions can result in agglomeration of silicon particles. Subsequent deagglomeration makes even another process step necessary, in particular in the case of the use of the silicon particles in electrode inks for lithium ion batteries, in which importance is placed on homogeneous particle size distributions.

DESCRIPTION OF THE INVENTION

It was therefore an object of the present invention to provide processes for milling silicon-containing solids, by means of which the abovementioned disadvantages can be avoided as far as possible and silicon particles having small average particle sizes can also be obtained.

This object has surprisingly been achieved by silicon-containing solids being milled by means of a jet mill using steam as milling fluid.

Jet mills using steam as milling fluid are known per se, for example from DE19824062 or U.S. Pat. No. 7,866,582. In these documents, silicon dioxide but not silicon is mentioned as material being milled. Steam has hitherto not been taken into consideration as milling fluid for milling silicon-containing solids in jet mills. This is because silicon reacts with water in an exothermic reaction with oxidation of the silicon and formation of hydrogen. Owing to the fact that fresh, active silicon surfaces having open chemical bonds, which are highly reactive toward water, are continually formed during milling of silicon-containing solids, it was feared that during milling of the silicon-containing solids in the presence of steam, oxidation would proceed so vigorously and to such an extent that particles produced in this way are completely oxidized or at least oxidized through to a considerable extent and therefore are no longer adequately usable in desired applications for silicon particles. In addition, corresponding formation of hydrogen during milling is highly problematical for safety reasons. Surprisingly, these problems do not occur, or at least do not occur in a manner which is a hindrance, in the process of the invention.

Conventional processes for milling silicon-containing solids, as in EP1754539 or EP3027690, in contrast are carried out under significantly milder conditions, for example under a protective gas atmosphere such as nitrogen or argon, or in air, or in less reactive solvents such as alcohols. Under such milling conditions or during subsequent storage of the milled silicon particles under normal conditions, thin oxide layers are known to be formed as passivating protective layers on the silicon particles. Surprisingly, the silicon particles produced according to the invention have the same properties, virtually the same properties or equivalent properties as silicon particles which have been produced by the abovementioned conventional processes and subsequently stored in air under normal conditions. This preferably also applies to the oxygen content of silicon particles of comparable size.

Advantageously, silicon particles having fine average particle sizes can also become accessible in an efficient way, as has hitherto only been possible using wet milling processes, by means of the process of the invention, with the disadvantages of wet milling processes, e.g. additional drying or deagglomeration steps, being able to be avoided, so that the process of the invention has, in comparison, a particular efficiency.

The invention provides processes for producing silicon particles by milling silicon-containing solids in a jet mill using a milling fluid containing steam.

The customary jet mills can be used. Jet mills generally comprise a milling chamber having inlets for the milling fluid and optionally one or more further devices such as classifiers.

Preferred jet mills are opposed-jet mills or spiral jet mills. Particular preference is given to dense-bed jet mills, spiral jet mills and in particular fluidized-bed opposed-jet mills.

Fluidized-bed opposed-jet mills contain, preferably in the lower third of the milling chamber, two or more inlets for the milling fluid, preferably in the form of nozzles, which are preferably located in a horizontal plane. The milling jet inlets are particularly preferably arranged around the circumference of the preferably round milling chamber in such a way that the milling jets all meet at a point in the interior of the milling chamber. The milling jet inlets are particularly preferably distributed uniformly around the circumference of the milling chamber. In the case of three milling jet inlets, the spacing is preferably in each case 120°.

The jet mills can also be equipped with one or more classifiers. The oversize particles can be limited by means of a classifier. Classifiers can be installed as separate unit downstream of the jet mills. Classifiers are preferably integrated into the jet mills, generally located spatially downstream of the milling chamber. Milled silicon particles can be discharged from the milling chamber with the gas stream of the milling fluid and fed into the classifier. In the classifier, the silicon particles are generally separated according to their particle size. Silicon particles having desired particle sizes can be discharged via the classifier and from the jet mill and isolated. Silicon particles which are too coarse can be recirculated into the milling chamber and subjected to renewed milling.

Particular preference is given to dynamic classifiers, for example dynamic air classifiers, in particular dynamic turbine classifiers. A dynamic air classifier contains, for example, a classifier wheel, a classifier wheel shaft and a classifier housing, with a classifier gap being formed between the classifier wheel and the classifier housing and a shaft passage being formed between the classifier wheel shaft and the classifier housing. The classifier gap and/or shaft passage are preferably flushed with a gas, in particular with an inert gas such as nitrogen or argon, or with steam, in particular superheated steam. The temperature of the gas is preferably so high that the steam does not condense in the jet mill.

Preference is given to fluidized-bed opposed-jet mills having an integrated classifier.

The jet mills can be constructed in a conventional way from materials which are customary for this purpose. The jet mills or parts of the jet mills, in particular the milling space, are preferably made of silicon or wear-resistant ceramic, e.g. zirconium oxide, silicon nitride or silicon carbide, or are lined therewith. The classifier wheel is the component of jet mills which is subjected to the greatest wear. The classifier wheel is preferably coated with diamond or made of a ceramic, in particular of a silicon-containing ceramic such as silicon nitride or silicon carbide. Such ceramics are particularly wear-resistant. These measures are suitable for avoiding or at least reducing contamination of the material being milled with foreign substances as a result of contact with the walls of the jet mill.

The term steam refers generally to water in the gaseous state of matter. Steam contains mainly water. Steam can be obtained, for example, by vaporizing or evaporating water.

The milling fluid according to the invention contains steam in a proportion of preferably ≥20% by volume, particularly preferably ≥50% by volume, most preferably ≥90% by volume.

The milling fluid contains condensed water or water droplets which have condensed out in a proportion of preferably <5% by volume, particularly preferably <1% by volume and most preferably <0.1% by volume. Oxygen is present in the milling fluid in a proportion of preferably ≤10% by volume, particularly preferably ≤5% by volume and most preferably ≤1% by volume. Nitrogen, noble gases or other inert gases are present in the milling fluid in a proportion of preferably ≤80% by volume, particularly preferably ≤50% by volume and most preferably ≤10% by volume. Organic solvents are present in the milling fluid in a proportion of preferably ≤20% by volume, particularly preferably ≤5% by volume and most preferably are not present at all. The milling fluid may contain other impurities, for example basic impurities such as ammonia or inorganic salts such as alkali metal or alkaline earth metal halides, sulfates or nitrates. Other impurities are present in the milling fluid in a proportion of preferably ≤10% by volume, particularly preferably ≤5% by volume and most preferably ≤1% by volume. The figures in % by volume are based in each case on the total volume of the milling fluid. The abovementioned components and also the figures in % by volume for different components are in each case disclosed both independently of one another and also in combination.

For the sake of clarity, it may be mentioned that any water content of air under tropical conditions at 100% relative atmospheric humidity is known to able to be 3% by volume. Air thus contains water only in traces. Air is not a milling fluid according to the invention.

The temperature of the milling fluid contained in steam is, at the respective pressure, preferably ≥2° C. above and particularly preferably ≥5° C. above the dew point of water. The dew point is the temperature at which condensation and evaporation of water are in equilibrium. In other words, the dew point is the temperature below which, at constant pressure, the prevailing temperature has to drop for water to condense from steam. At the dew point, the relative humidity of air is 100%. The dew point is determined in an established way using a dew point hygrometer.

Preference is given to superheated steam. In superheated steam, water is generally present in the gaseous state of matter. In superheated steam, the individual water molecules are generally isolated, i.e. not condensed. Water in the gaseous state of matter generally does not contain any water droplets which have condensed out. Visible water droplets which have condensed out have, for example, average diameters of greater than 400 nm. As long as superheated steam remains in its superheated state, no condensation, i.e. no formation of water droplets, takes place, even on contact with the ambient air or other gases.

Superheated stem is obtainable, for example, by heating water to the boiling point, subsequent introduction of heat of vaporization to form saturated steam and finally introduction of further heat.

Saturated steam is, as is known, an equilibrium at which precisely the same amount of water evaporates as condenses. Heat of vaporization is generally the quantity of heat which is required to convert the water droplets which have condensed out in saturated steam into the gaseous state of matter, i.e. into gaseous water.

Superheated steam is colorless and transparent, as is generally known, in contrast to wet steam which contains water molecules in the form of small droplets which scatter visible light and thus form a mist, which in conventional speech is usually also referred to imprecisely as steam.

In the phase diagram of water, the saturated steam curve forms the dividing line between wet steam and superheated steam.

At a given pressure, the temperature of the milling fluid flowing into the jet mill is preferably greater than the temperature which corresponds to the saturated steam curve of water at this pressure. The temperature of the milling fluid is particularly preferably at least 2° C. above the temperature of the saturated steam curve and very particularly preferably at least 5° C. above the corresponding temperature of the saturated steam curve.

The milling fluid introduced into the milling chamber has a speed of sound of preferably >343 m/s, particularly preferably ≥350 m/s and most preferably ≥450 m/s. The speed of sound of the milling fluid is generally higher than the speed of sound of air (343 m/s). Such speeds of sound are particularly advantageous for achieving the preferred degree of milling or for producing silicon particles having the particle size distributions indicated below.

The milling fluid has a pressure of preferably from 5 to 220 bar, particularly preferably from 10 to 150 bar and most preferably from 20 to 70 bar. The milling fluid has a temperature of preferably from 160 to 800° C., particularly preferably from 180 to 600° C. and most preferably from 200 to 400° C.

The above data concerning steam or the milling fluid preferably relate to the steam or the milling fluid as it is introduced into the jet mill, in particular through the nozzles into the milling chamber.

The determination of the particle size distribution of the silicon particles produced according to the invention and of the silicon-containing solids (starting material) is, according to the invention, carried out in accordance with ISO 13320 by means of static laser light scattering using the measuring instrument Horiba LA 950. The samples are measured wet in isopropanol. In the preparation of the samples, particular attention is paid to the dispersion of the particles in the measurement solution in order not to measure the size of agglomerates instead of individual particles. For this purpose, greatly diluted suspensions (from 0.2 to 2% by weight solids content) of the silicon particles in isopropanol are produced, and these were treated with ultrasound for 30 minutes (for example in a Hielscher laboratory ultrasonic instrument model UIS250v with ultrasonic probe LS24d5, 120 W power, 50% pulsed) before the measurement.

The particle size distributions are characterized by the values $d_{10}$, $d_{50}$ or $d_{90}$, which represent the 10%, 50% and 90%, respectively, percentile values of the volume-weighted diameter size distributions of the particles.

The silicon-containing solids, i.e. the starting material, have a volume-weighted particle size distribution having a $d_{90}$ of preferably ≤4 mm, particularly preferably $d_{90}$≤2 mm and very particularly preferably $d_{90}$≤500 µm.

The median $d_{50}$ of the volume-weighted diameter size distribution of the silicon particles produced according to the invention is in the range of preferably from 0.3 µm to 100 µm, particularly preferably from 0.5 µm to 10 µm and most preferably from 0.5 µm to 5 µm.

The $d_{10}$ of the silicon particles produced according to the invention is in the range of preferably from 0.1 µm to 50 µm, particularly preferably from 0.2 µm to 25 µm and most preferably from 0.3 µm to 2.5 µm.

The $d_{90}$ of the silicon particles produced according to the invention is in the range of preferably from 0.6 µm to 300 µm, particularly preferably from 1 µm to 30 µm and most preferably from 1.5 µm to 15 µm.

The relative breadth of the volume-weighted size distribution $(d_{90}-d_{10})/d_{50}$ of the silicon particles produced according to the invention is preferably 3 and particularly preferably 2.

The silicon particles produced according to the invention have fracture surfaces which can have sharp edges. They are typically splinter-shaped.

One possibility for characterizing the particle shape is the sphericity. According to the definition of Wadell, the sphericity $\psi$ is the ratio of the surface area of a sphere of the same volume to the actual surface area of a body. In the case of a sphere, $\psi$ has the value 1. According to this definition, the silicon particles produced according to the invention have a sphericity of preferably $0.3<\psi<0.9$ and particularly preferably $0.5<\psi<0.9$.

According to an alternative definition, the sphericity S is the ratio of the circle-equivalent diameter of the projected area A of a particle onto a plane to the corresponding diameter from the circumference U of this projection: $S=\sqrt{\pi A}/U$. In the case of an ideal circle, S has the value 1. In the case of the silicon particles produced according to the invention, the sphericity S is in the range of preferably from 0.5 to 0.9. The measurement of the sphericity S is carried out by graphical evaluation of optical micrographs of individual particles or, in case of particles <10 µm, scanning electron micrographs.

The international standard of the "Federation Européenne de la Manutention" gives, in FEM 2.581, an overview of the aspects under which a bulk material is to be examined. The standard FEM 2.582 defines the general and specific bulk material properties in respect of the classification. Characteristic values which describe the consistency and the state of the material are, for example, particle shape and particle size distribution (FEM 2.581/FEM 2.582: General characteristics of bulk products with regard to their classification and their symbolization).

According to DIN ISO 3435, bulk materials can be subdivided into 6 different particle shapes as a function of the nature of the particle edges:
I: sharp edges having approximately equal extensions in the three dimensions (for example: cube);
II: sharp edges of which one is significantly longer than the other two (for example: prism, blade);
III: sharp edges of which one is significantly smaller than the other two (example: plate, flakes);
IV: round edges having approximately equal extensions in the three dimensions (for example: sphere);
V: round edges, significantly greater in one direction than in the other two (for example: cylinder, rod);
VI: fibrous, thread-like, lock-like, entangled.

According to this classification of bulk materials, the silicon particles produced according to the invention are preferably particles of the particle shapes I, II or III.

The following information with regard to the chemical composition relate, unless indicated otherwise, both to the silicon particles produced according to the invention and also to the silicon-containing solids used as starting material.

For the purposes of the present invention, silicon is generally a solid containing phases of elemental silicon.

Preference is given to elemental silicon. This is because elemental silicon is particularly advantageous for processes for producing anode materials containing silicon particles for lithium ion batteries. Such silicon has the greatest storage capacity for lithium ions.

Elemental silicon is to be understood as high-purity polysilicon having a small proportion of foreign atoms (for example B, P, As), deliberately doped silicon or else metallurgical silicon which can have a specified amount of elemental impurities (for example Fe, Al, Ca).

The silicon can also contain silicon oxide or a binary, ternary or multinary silicon-metal alloy (containing, for example, Sn, Ca, Co, Ni, Cu, Cr, Ti, Al, Fe).

The metallic or elemental impurities in the silicon preferably amount to ≤2% by weight, particularly preferably ≤1% by weight and very particularly preferably ≤0.5% by weight.

If the silicon contains silicon oxide, then the stoichiometry of the oxide SiOx is preferably in the range $0<x<1.3$. If the silicon contains a silicon oxide having a higher stoichiometry, then the layer thickness of this on the surface is preferably less than 10 nm and particularly preferably less than 5 nm.

The silicon particles produced according to the invention have, based on 1 $m^2$ of particle surface, an oxygen content of preferably ≤10 mg and particularly preferably ≤6 mg (method of determination: the oxygen content per unit particle surface area in mg/$m^2$ is the ratio of the specific oxygen content per unit mass of silicon, which is measured using an oxygen analyzer Leco TCH 600, and the particle surface area in $m^2$/g calculated from the measured particle size distribution assuming spherical particles. This particle surface area is obtained directly by measurement using a Horiba LA950).

However, silicon-containing solids having a different composition can also be used as starting material in the process of the invention, for example silicon having a higher proportion of foreign atoms.

To carry out the process of the invention, the silicon-containing solids are generally introduced into the milling chamber of the jet mill. Unless indicated otherwise, milling by means of the jet mill can be operated in a conventional way.

The milling fluid containing steam is generally introduced into the milling chamber through one or more milling jet inlets, preferably in the form of nozzles. In general, one or more milling fluid gas streams (milling jets) are present in the milling chamber. On entry into the milling chamber, the milling fluid usually expands.

The silicon-containing solids to be milled are generally carried into the milling chamber by milling jets and usually accelerated to high velocities. This ultimately leads to comminution or milling of silicon. The milling of the solids generally occurs as a result of different solid particles colliding or by solid particles impinging on the wall of the milling chamber. The milling or comminution is thus mainly a result of impingement stress. Moving mechanical tools such as rotors or milling media are generally not used in the milling chamber or in the jet mill.

As is known, the particle diameters of the milled products can be influenced via the collision speed of the particles. The particle diameter of the milled products is, as is known, proportional to the roof of the reciprocal of the collision speed of the particles. The collision speed can be predetermined by the jet speed of the milling jets.

When steam is used as milling fluid, the problem of steam condensing out, in particular during start-up or running-down of the jet mill, can occur. The jet mill is preferably designed and/or operated in such a way that condensation of steam in the jet mill does not occur. The start-up of the jet mill is preferably preceded by a heating-up phase. In the heating-up phase, the milling chamber, in particular the milling space, is heated to a temperature above the dew point of the steam. Heating is preferably effected by passing hot gas through the milling chamber. The hot gas is preferably not steam and is particularly preferably air and in particular an inert gas such as nitrogen or argon. The temperature of the gas at the outlet from the milling chamber is preferably greater than the dew point of the steam. When running-down the jet mill after conclusion of the milling operation or for cooling the jet mill, it is possible, for example, for dried gas which has a lower temperature than the steam introduced to be introduced into the milling chamber. Dried gas is preferably not steam, and is particularly preferably air and in particular an inert gas such as nitrogen or argon. Condensation of steam can be prevented by such measures. In addition, the duration of start-up or running-down of the jet mill can be shortened in this way.

The process of the invention is, owing to the use according to the invention of steam, advantageously a dry milling process, i.e. it does without solvents or does not have to be operated in dispersion. For this reason, silicon particles can be obtained directly in the form of powders by the milling process of the invention, without additional process steps for drying or deagglomeration of the silicon particles being necessary. In addition, silicon particles having very small average particle diameters can be obtained.

Contamination of the material being milled with foreign substances can advantageously be ruled out, for example by means of the configuration of the milling chamber. Contamination is a challenge, particularly in the case of wet milling processes as a result of the use of milling media and the associated abrasion.

Any occurrence of steam condensates can be countered in a simple way.

The silicon particles produced according to the invention can advantageously be used directly as starting material for an anode active material of lithium ion batteries, without a further process step for treating the milled silicon products being necessary.

The invention will be illustrated with the aid of the following examples:

EXAMPLE 1

600 g of high-purity polycrystalline silicon powder composed of solar silicon (Wacker BGF (sg) type PCL-NCS-F, $d_{10}$=100 µm, $d_{50}$=240 µm, $d_{90}$=440 µm) were introduced into the reservoir of a steam jet mill s-Jet 25 (manufacturer: Netzsch Trockenmahltechnik GmbH). The mill was operated using 15 kg/h of steam at 190° C. and a gauge pressure of 10 bar. The steam jet mill had previously been heated by means of nitrogen having a temperature of 120° C. The speed of rotation of the classifier wheel was 13 000 rpm. After 140 minutes, the steam jet mill was stopped and the collection vessel on the particle filter was opened. The particles were subsequently stored at room temperature in air under ambient pressure.

The collection vessel contained 230 g of silicon powder having $d_{10}$=0.37 µm, $d_{50}$=0.83 µm and $d_{90}$=1.9 µm (determined using the measuring instrument Horiba LA950).

The surface area calculated from the particle size distribution assuming spherical particles was 4 $m^2$/g.

The oxygen content (determined using the oxygen analyzer Leco TCH 600) was 2.1% by weight and 5.2 mg/$m^2$, based on the calculated particle surface area.

EXAMPLE 2

Example 2 was carried out in the same way as Example 1, with the following differences:

The speed of rotation of the classifier wheel was 4000 rpm and the steam jet mill was stopped after 20 minutes.

The collection vessel contained 350 g of silicon powder having $d_{10}$=2 µm, $d_{50}$=4.3 µm and $d_{90}$=7.4 µm (determined using the measuring instrument Horiba LA950).

The surface area calculated from the particle size distribution assuming spherical particles was 0.82 $m^2$/g.

The oxygen content (determined using the oxygen analyzer Leco TCH 600) was 0.44% by weight and 5.4 mg/$m^2$, based on the calculated particle surface area.

Comparative Example 3

5 kg of high-purity polycrystalline silicon powder composed of solar silicon (Wacker BGF (sg) type PCL-NCS-F, $d_{10}$=100 µm, $d_{50}$=240 µm, $d_{90}$=440 µm) were introduced into the reservoir of a fluidized-bed jet mill CGS 16 (manufacturer: Netzsch Trockenmahltechnik GmbH). The fluidized-bed jet mill was operated using 93 $m^3$/h of nitrogen at 20° C. and a gauge pressure of 7 bar. The speed of rotation of the classifier wheel was 6000 rpm. After 60 minutes, the fluidized-bed jet mill was stopped and the collection vessel on the particle filter was opened. The particles were subsequently stored at room temperature in air under ambient pressure.

The collection vessel contained 3.4 kg of silicon powder having $d_{10}$=3.1 µm, $d_{50}$=4.8 µm and $d_{90}$=7.1 µm (determined using the measuring instrument Horiba LA950).

The surface area calculated from the particle size distribution assuming spherical particles was 0.57 $m^2$/g.

The oxygen content (determined using the oxygen analyzer Leco TCH 600) was 0.27% by weight and 4.7 mg/$m^2$, based on the calculated particle surface area.

The invention claimed is:

1. A process for producing silicon particles, said process comprising milling solids containing phases of elemental silicon in a jet mill using a milling fluid, which contains ≥20% by volume of steam, based on a total volume of the milling fluid, and collecting the silicon particles from the jet mill, wherein the solids containing phases of elemental silicon are selected from the group consisting of high-purity polysilicon having a small proportion of foreign atoms, deliberately doped silicon and metallurgical silicon.

2. The process for producing silicon particles as claimed in claim 1, wherein the milling fluid has a temperature of from 160 to 800° C.

3. The process for producing silicon particles as claimed in claim 2, wherein the milling fluid has a pressure of from 5 to 220 bar.

4. The process for producing silicon particles as claimed in claim 3, wherein the milling fluid contains ≥50% by volume of steam, based on the total volume of the milling fluid.

5. The process for producing silicon particles as claimed in claim 4, wherein the milling fluid contains at least one of nitrogen, noble gases and other inert gases in a collective volume which is less than or equal to 50% of the total volume of the milling fluid.

6. The process for producing silicon particles as claimed in claim 5, wherein the milling fluid is introduced into a milling chamber at a speed of sound of >343 m/s.

7. The process for producing silicon particles as claimed in claim 6, wherein a temperature of the steam is ≥2° C. above a dew point of water.

8. The process for producing silicon particles as claimed in claim 7, wherein the steam is superheated steam.

9. The process for producing silicon particles as claimed in claim 8, wherein the process further comprises providing the superheated steam by heating water to a boiling point, subsequently introducing a heat of vaporization to form saturated steam and finally introducing further heat.

10. The process for producing silicon particles as claimed in claim 9, wherein at a given pressure, the temperature of the milling fluid flowing into the jet mill is greater than a reference temperature which corresponds to a saturated steam curve of water at the given pressure, where the saturated steam curve in a phase diagram of water is a dividing line between wet steam and superheated steam.

11. The process for producing silicon particles according to claim 10, wherein a median of a volume-weighted diameter size distribution $d_{50}$ of the silicon particles is in a range from 0.5 µm to 10 µm.

12. The process for producing silicon particles as claimed in claim 11, wherein the silicon particles have an oxygen content of ≤10 mg, based on 1 $m^2$ of surface area of the silicon particles.

13. The process for producing silicon particles as claimed in claim 1, wherein the milling fluid has a pressure of from 5 to 220 bar.

14. The process for producing silicon particles as claimed in claim 1, wherein the milling fluid contains ≥50% by volume of steam, based on the total volume of the milling fluid.

15. The process for producing silicon particles as claimed in claim 1, wherein the milling fluid contains at least one of nitrogen, noble gases and other inert gases in a collective volume which is less than or equal to 50% of the total volume of the milling fluid.

16. The process for producing silicon particles as claimed in claim 1, wherein the milling fluid is introduced into a milling chamber at a speed of sound of >343 m/s.

17. The process for producing silicon particles as claimed in claim 1, wherein a temperature of the steam is ≥2° C. above a dew point of water.

18. The process for producing silicon particles as claimed in claim 1, wherein the steam is superheated steam.

19. The process for producing silicon particles as claimed in claim 18, wherein the process further comprises providing the superheated steam by heating water to a boiling point, subsequently introducing a heat of vaporization to form saturated steam and finally introducing further heat.

20. The process for producing silicon particles as claimed in claim 18, wherein at a given pressure, a temperature of the milling fluid flowing into the jet mill is greater than a reference temperature which corresponds to a saturated steam curve of water at the given pressure, where the saturated steam curve in a phase diagram of water is a dividing line between wet steam and superheated steam.

21. The process for producing silicon particles according to claim 1, wherein a median of a volume-weighted diameter size distribution $d_{50}$ of the silicon particles is in a range from 0.3 µm to 100 µm.

22. The process for producing silicon particles as claimed in claim 1, wherein the silicon particles have an oxygen content of ≤10 mg, based on 1 $m^2$ of surface area of the silicon particles.

23. The process for producing silicon particles as claimed in claim 1, wherein the solids containing phases of elemental silicon contain no more than 2% by weight of metallic or elemental impurities.

24. A process for producing silicon particles, said process comprising:
   providing a starting material selected from the group consisting of polysilicon, deliberately doped silicon and metallurgical silicon, wherein the starting material contains no more than 2% by weight of metallic or elemental impurities;
   providing a milling fluid comprising steam in an amount of at least 20% by volume of the milling fluid;
   milling the starting material in a jet mill using the milling fluid; and
   collecting the silicon particles from the jet mill.

25. A process for producing silicon particles, said process comprising milling solids containing phases of elemental silicon in a jet mill using a milling fluid, when contains ≥20% by volume of steam, based on a total volume of the milling fluid, and collecting the silicon particles from the jet mill, wherein the solids containing phases of elemental silicon are high-purity polycrystalline silicon having a small proportion of foreign atoms.

* * * * *